United States Patent
Campos et al.

(10) Patent No.: US 8,351,465 B2
(45) Date of Patent: Jan. 8, 2013

(54) SYSTEM AND METHOD OF DECOUPLING MEDIA ACCESS CONTROL (MAC) AND PHYSICAL (PHY) OPERATING LAYERS

(75) Inventors: Luis Alberto Campos, Superior, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 407 days.

(21) Appl. No.: 12/827,496

(22) Filed: Jun. 30, 2010

(65) Prior Publication Data
US 2011/0134938 A1 Jun. 9, 2011

Related U.S. Application Data

(60) Provisional application No. 61/266,653, filed on Dec. 4, 2009.

(51) Int. Cl.
*H04J 3/24* (2006.01)
(52) U.S. Cl. ............................. 370/474; 370/466
(58) Field of Classification Search .......... 370/310–350, 370/395.5–395.52, 465–474
See application file for complete search history.

(56) References Cited

U.S. PATENT DOCUMENTS

| | | | | |
|---|---|---|---|---|
| 7,633,970 | B2 * | 12/2009 | van Kampen et al. | 370/473 |
| 7,680,150 | B2 * | 3/2010 | Liu et al. | 370/469 |
| 2007/0201468 | A1 * | 8/2007 | Jokela | 370/390 |
| 2011/0075759 | A1 * | 3/2011 | Seok | 375/295 |

* cited by examiner

*Primary Examiner* — Kan Yuen
(74) *Attorney, Agent, or Firm* — Brooks Kushman P.C.

(57) ABSTRACT

A layered operating system architecture enables decoupling of a media access control (MAC) layer from a physical (PHY) layer. The decoupled MAC and PHY layer removes responsibility from the MAC layer with respect to understanding network resources, network space and network scheduling and allocation demands when processing data for transport over a network. The MAC layer may instead operate according to an allocation scheduled provided by a convergence layer responsible for understanding the varying conditions and demand attendant to supporting communications over the network.

16 Claims, 3 Drawing Sheets

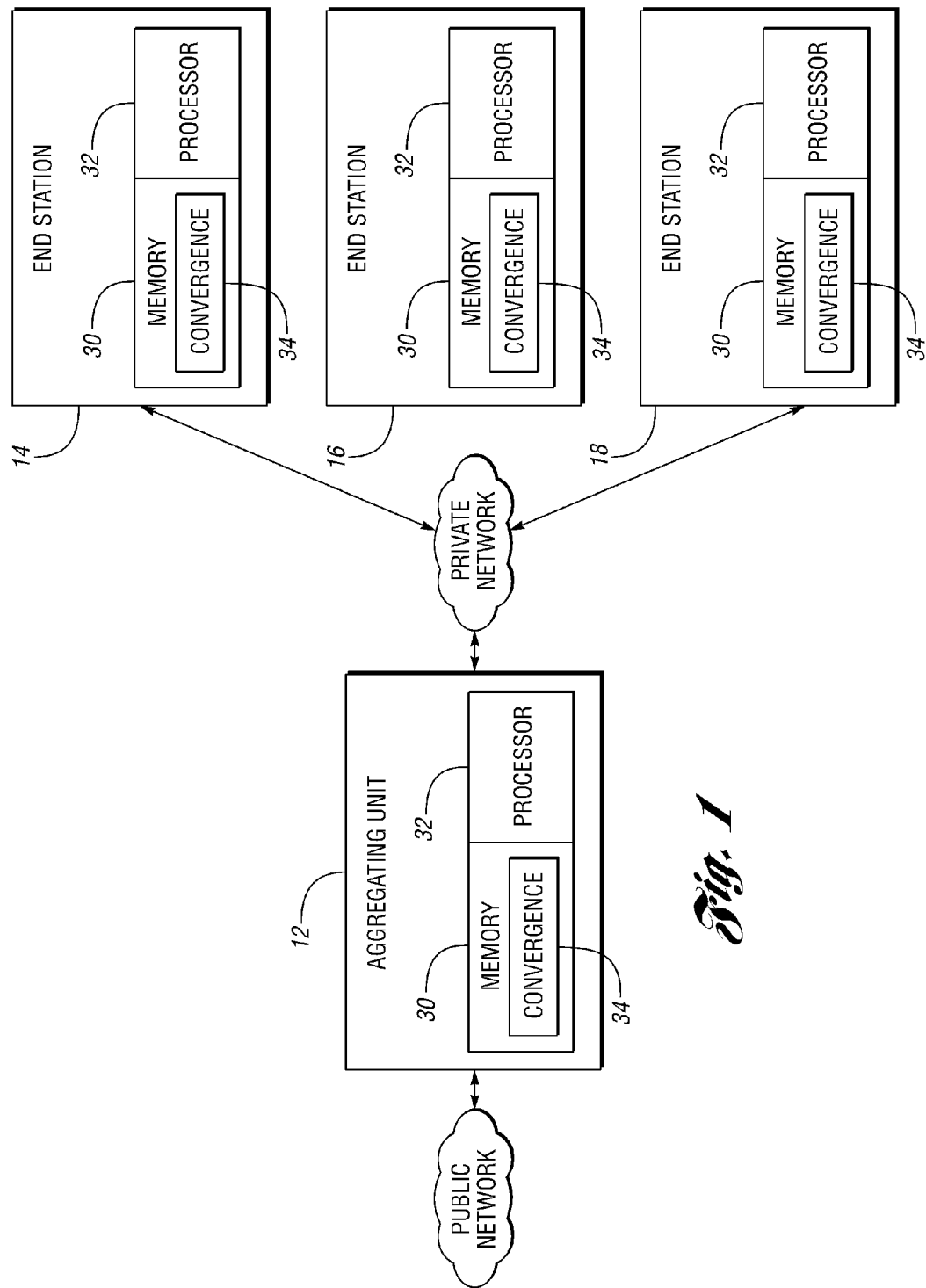

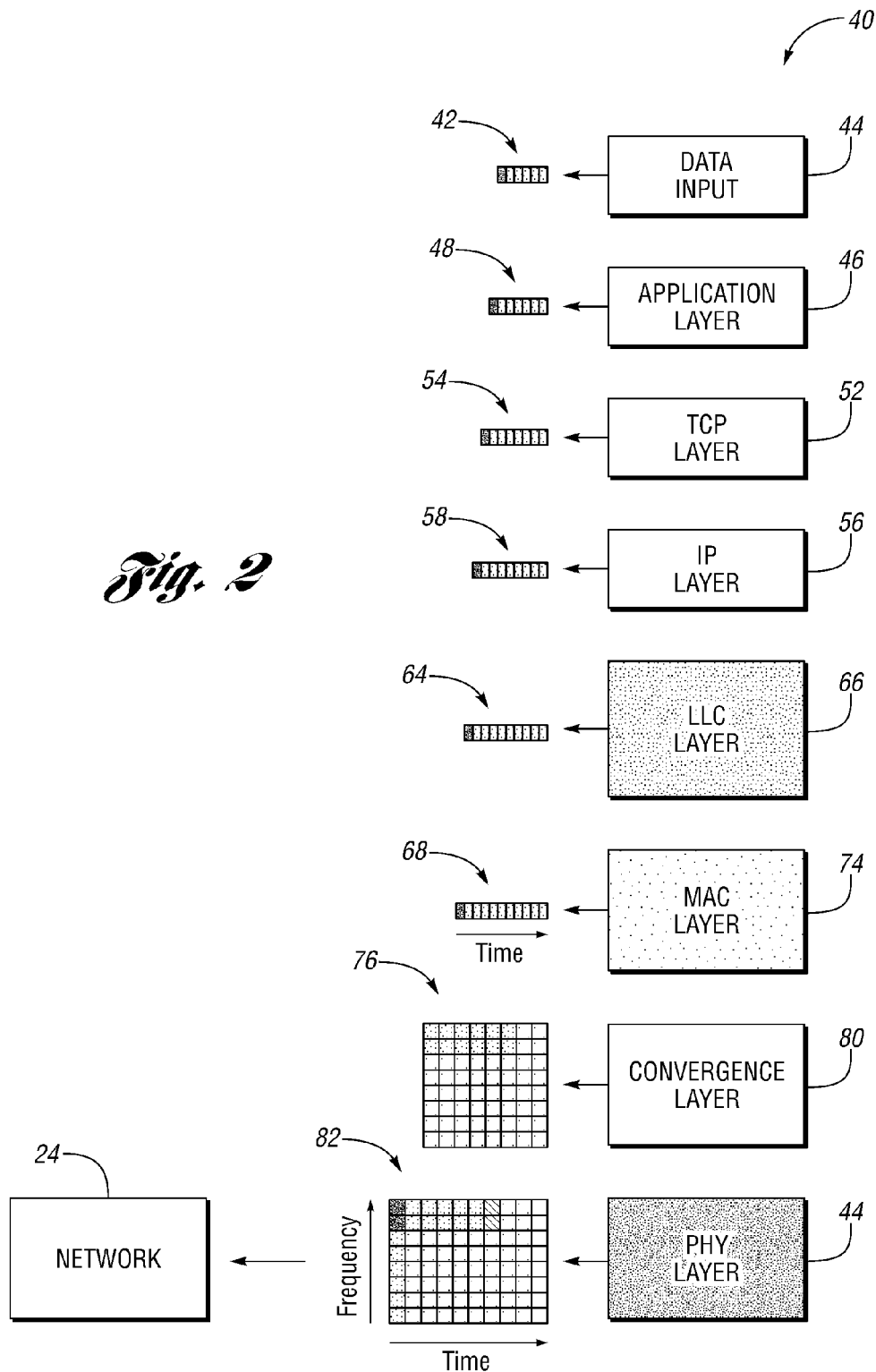

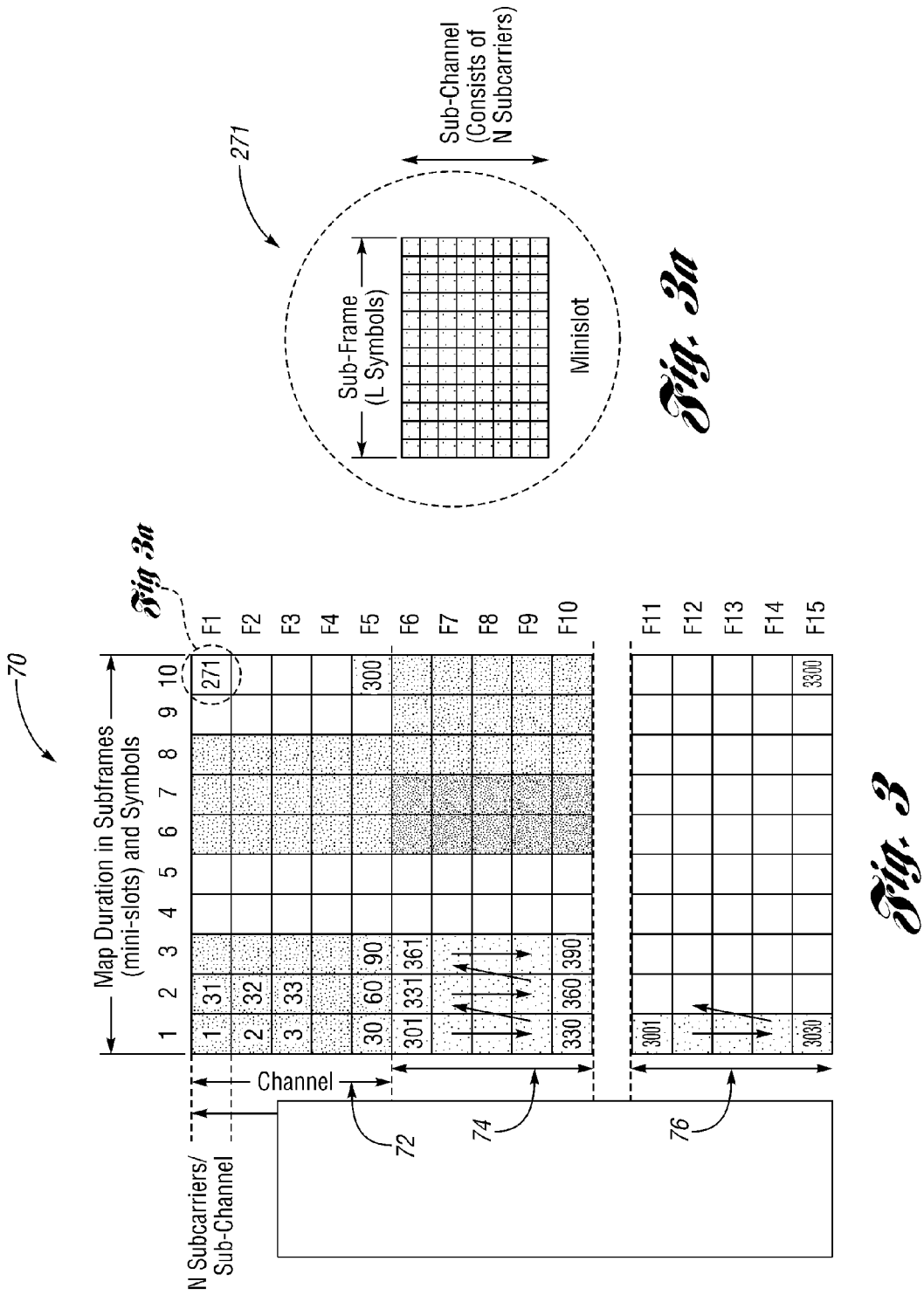

SYSTEM AND METHOD OF DECOUPLING MEDIA ACCESS CONTROL (MAC) AND PHYSICAL (PHY) OPERATING LAYERS

CROSS-REFERENCE TO RELATED APPLICATIONS

This application claims the benefit of provisional application 61/266,653, filed Dec. 4, 2009, the disclosure of which is hereby incorporated in its entirety by reference.

TECHNICAL FIELD

The present invention relates to decoupling MAC and PHY layers, such as but not limited to MAC and PHY layers associated with the Operating System Interconnection (OSI) standard, Data Over Cable Service Interface Specification (DOCSIS), IEEE 802.11 standard for wireless local area networks (WLAN), IEEE 802.16 for wireless networks (WiMax), code/frequency/time division multiple access code (CDMA/FDMA/TDMA) standards for telephony communications and/or other layered based architectures and standards that rely on data link and physical layers or the equivalents thereof.

BACKGROUND

An end station refers to any device having capabilities to transmit data over a wireless, wireline, mobile phone, or other type or combinations of electronic network. The data transmission may require the end station to receive corresponding data through an input and to output the data through a port or other connection to the network. The process of preparing the data for transmission over the network or to process data received over the network may be organized according a layered based architecture, such as but not limited to the layered based architectures associated with Operating System Interconnection (OSI) standard, Data Over Cable Service Interface Specification (DOCSIS), IEEE 802.11 standard for wireless local area networks (WLAN), IEEE 802.16 for wireless networks (WiMax), code/frequency/time division multiple access code (CDMA/FDMA/TDMA) standards for telephony communications and/or other layered based architectures and standards.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a decoupled system in accordance with one non-limiting aspect of the present invention;

FIG. 2 schematically illustrates decoupling of the MAC and PHY layers according to one non-limiting aspect of the present invention; and FIG. 3 illustrates a MAP in accordance with one non-limiting aspect of the present invention.

DETAILED DESCRIPTION

FIG. 1 illustrates a decoupled system 10 in accordance with one non-limiting aspect of the present invention. The system 10 includes an aggregating unit 12 and one or more end stations 14, 16, 18, which may operate in a manner similar to the system according to information provided, as described in U.S. patent application Ser. No. 12/826,889, entitled Multi-Tier Polling, filed Jun. 30, 2010, the disclosure of which is hereby incorporated in its entirety by reference. The aggregating unit 12 may be operable to poll each end station 14, 16, 18 individually and adaptively such that polling messages or other types of polling related transmissions may be individually communicated from the aggregating unit 12 to selective ones of the end stations 14, 16, 18 at selective polling intervals. One non-limiting aspect of the present contemplates relying on this adaptive polling capability to facilitate management of network space.

The aggregating unit 12 may be any type of device operable to facilitate allocating resources of a network 22 used to transmit data from the end stations 14, 16, 18. The network 22 is labeled to include a private network 24 and a public network 26. The private network 24 may be used to designate a capability to support private communications between the aggregating unit 12 and the ends stations 14, 16, 18, such as over a closed network or a private virtual network. The communications may be executed through out-of-band (OOB) messaging or other messaging protocols between the aggregating unit 12 and the end stations 14, 16, 18. The public network 26 may be used to designate the Internet or other less secure or non-proprietary networks. The end stations 14, 16, 18 may transmit data according to the OOB or other private protocol, such as to transmit polling related responses/requests, and/or according to other protocols, such as to support IP related communications over the public network.

The aggregating unit 12 is shown as a gateway between the public and private networks 24, 26 for exemplary purposes. The aggregating unit 12 need not act as a gateway and the present invention is not intended to be limited to the aggregating unit 12 operating to support communications between public and private networks 24, 26. The present invention contemplates its use in many environments where it may be desirable to manage network space by adapting polling or other data intensive operations according to operating activities of the end stations 14, 16, 18 and/or to support decoupling of MAC and PHY layers. To this end, the aggregating unit 12 and the end stations 14, 16, 18 may correspond with any type of electronic device and/or logically executing unit and the network 22 may corresponding with any type or combination of wireline and wireless networks.

The present invention is predominately described with respect to a cable television related configuration in that the private network 24 may correspond with a wireline, cable network provided to a subscriber's home where the end stations 14, 16, 18 may correspond with a cable modem, media terminal adaptor (MTA), settop box (STB), television, or other device desiring data communications over one or more of the networks 24, 26, such as according to communications executed according to the Data Over Cable Service Interface Specification (DOCSIS). Of course, the present invention is not limited to cable related services or cable dependent communications and fully contemplates its application within non-cable environments.

One or more of the end stations 14, 16, 18 may be provided in a subscriber's home, or elsewhere in the event the end station 14, 16, 18 is a mobile device (e.g., pda, mobile phone, netbook, tablet, etc.), such that it may be operable to provide or otherwise facilitates access to any number or type of services, such as but not limited to Voice over Internet Protocol (VoIP), channel surfing (e.g., changing television channels tuned to over a QAM or IP signaling stream), and file upload/download through P2P or other operations. One non-limiting aspect of the present invention contemplates managing the processing performed by the end stations 14, 16, 18 and/or aggregating unit 12 to support these and other data transmission dependent services.

Each of the aggregating unit 12 and the end stations 14, 16, 18 are shown to include a memory 30 and a processor 32. The memory 30 may store code or other computer readable information to be executed with the processor 32. The stored code may include a layered operating system or architecture contemplated by the present invention to support decoupling of the MAC and PHY layers. While not shown, each of the aggregating unit 12 and the end stations 14, 16, 18 may include an input, such as to receive an input from a user or from another device, and an output or output port to facilitate transporting and receiving data over the network.

In accordance with one non-limiting aspect of the present invention a convergence layer 34 may be included to facilitate decoupling the MAC and PHY layers. The convergence layer 34 may be a logically executing layer configured in accordance with the present invention to decouple MAC and PHY layers. The convergence layer may be added or otherwise integrated into a layered based architecture used by one or more of the aggregating unit 12 and the end stations 14, 16, 18 to facilitate data input and output, such as but not limited to layered based architectures organized according Operating System Interconnection (OSI) standard, DOCSIS, IEEE 802.11 standard for wireless local area networks (WLAN), IEEE 802.16 for wireless networks (WiMax), code/frequency/time division multiple access code (CDMA/FDMA/TDMA) standards for telephony communications and/or other layered based architectures and standards.

FIG. 2 illustrates a flowchart 40 of a method for decoupling of the MAC and PHY layers according to one non-limiting aspect of the present invention. The illustration is shown with respect to layers commonly used in DOCSIS supported communications. This illustration is provided for exemplary purposes and is not intended to necessarily limit the scope and contemplation of the present invention to DOCSIS related data transmissions. The illustration depicts a processing progression where a data input 42 is processed according to actions or functions dictated by each of a plurality of layers prior to being output for transmission over the network. The actual operations associated therewith may be performed by the processor 32 or other logically executing device.

Block 44 relates to an end station receiving the data input 42. The data input 42 may be received from a user, from another device, and/or from some other communicating element. The data 42 is shown to be comprised of a number of bits or bytes arranged in a one-dimensional, time-based configuration, which is illustrated with as a data frame 42. The length of the data frame 42 may vary depending on the type of data being inputted and/or for any number of other reasons. Block 46 relates to inputted data 42 may be processed using an application layer operating on the end station. The application layer may be used to append application data to the data frame 42 in order to generate an application frame 48. The application frame 48 may be used to represent the data input as processed according to a particular application executing on the end station.

Once the application frame 48 is generated, i.e., after the desired application has performed its processing, the resulting information is further processed to facilitate being communicated over the network. Block 52 relates to this processing beginning with a transmission control protocol (TCP) layer operating on the end stations adding TCP data to the application frame 48 in order to form a TCP frame 54. The TCP frame may be used to append data needed to prepare the application frame for IP based transmission. As such, the TCP layer may be coupled with an Internet protocol (IP) layer operation on the end station. Block 56 relates to the IP layer appending IP data to the TCP frame in order to generate an IP frame 58. The IP data may be used to append addressing methods and structures to facilitate datagram encapsulation of the TCP frame in further preparation of the impending network transmission.

The scheduling of the network transmission may include data link layer processing. Block 62 relates to a logic link control (LLC) layer operating on the end station adding LLC data to the IP frame 58 in order to form a LLC frame 64. The LLC data may be used to append flow and error control related data to the TCP frame. Block 66 relates to a MAC layer operating on the end station appending MAC data to the LLC frame 64 in order to generate a MAC frame 68. The MAC data may be used to facilitate multiple access and other network related transmission requirements. In particular, the MAC data may be used to specify a start time and a duration desired for the transmission of the inputted data. The MAC layer may append the MAC data to facilitate scheduling transmission of the data input.

FIG. 3 illustrates a MAP 70 in accordance with one non-limiting aspect of the present invention. The MAP 70 may be used to represent network resources or space that is available to facilitate network-based data transmission. The MAP 70 illustrates a number of channels 72, 74, 76, each having a number of minislots (1-3300). Each minislot corresponds with one sub-channel and one sub-frame, the sub-channels corresponding with a frequency (F1-F15) and the sub-frames corresponding with a unit time (1-10). Each minislot may be used to represent a capacity unit comprised of a number of sub-carriers over time. The sub-carriers may be grouped based on their capacity characteristics to form a sub-channel of constant capacity. One non-limiting aspect of the present invention contemplates collecting or otherwise arranging the sub-carriers such that each minislot totals the same capacity, regardless of the actual number of sub-carriers being used to form each minislot. (As one skilled in the art will appreciate, the amount of data that can be carried by certain sub-carriers can vary according to frequency, network characteristics, etc.).

The frequency (sub-channel) and time (sub-frame) coordinates represented along the vertical axis and the horizontal axis respectively may be used identify a starting frequency (start sub-channel) and an encompassed frequency range (number of sub-channels) as well as a start time (start sub-frame) and a duration (number of sub-frames) of data transmitted over the network. The aggregating unit 12 or other device associated with the network 22 may be responsible for supporting the MAP 70 and coordinating scheduling and allocation of the related resources in order to enable the data communications required by the end stations 14, 16, 18 and the services provided therethrough. In order for the data input to be transmitted over the network 22, it must be mapped to the two-dimensional MAP 70, or a similar two-dimensional MAP, in the event the data is being transmitted over the type of network that allocates resources in two-dimensions as function of frequency and time.

The two-dimensional mapping contemplated by the present invention requires detailed knowledge about available sub-carriers and related processing in order to properly group the sub-carriers into the same sized (capacity) sub-channels, including capabilities to monitor available network resources and continuously changing characteristics of the sub-carriers (as one skilled in the art will appreciate, the amount of data each sub-carrier can transport may vary over time according to any number of transient network conditions, such as but not limited to network congestion and utilization levels). The two-dimensional mapping also requires knowledge of the two-dimensional MAP parameters such as the MAP duration in sub-frames and the number of sub-channels to be used for transmission. These parameters are configurable to achieve the intended performance (latency). In order the limit the complexity of the MAC layer and/or to allow scaling of the MAC layer to support high speed operations, one non-limiting aspect of the present invention contemplates shielding the MAC layer from having to append data necessary to map the data input, i.e., the LLC frame, to the two-dimensional MAP.

Returning to FIG. 2, the MAC data included as part of the MAC frame 68 may be used to map the MAC frame in one-dimension as a function of time such that the beginning and ending of each MAC frame 68 is marked. The convergence layer may instruct the MAC layer to group the MAC frames 68 or otherwise limit the size of the MAC frames 68 to correspond with the size associated with one or more of the minislots. In the event the minislots are grouped to support transmission of frames having certain number of bits, the convergence layer may require the MAC layer to append MAC data to multiple portions of the MAC frame 68 such that the amount of data between the MAC data corresponds with the size of the one or more minislots assigned to support transmission of each MAC frame.

Block 74 relates to the convergence layer translating the one-dimensional MAC data added to the MAC frame 68 into the two-dimensional system of the MAP 70 to form a convergence frame 76. This may include the convergence layer assessing the start time and duration in number of minislots of each MAC frame 68 and translating it to corresponding minislot occupancy in frequency and time. The corresponding minislots may be referenced according to the frequency and time coordinates associated therewith, e.g. a start frequency, start time, duration according to number of sub-frames, and bandwidth according to number of sub-channels. One non-limiting aspect of the present invention contemplates translating the MAC frames in a zig-zag pattern, as shown in FIG. 3. The zig-zag pattern corresponds with sequentially mapping the MAC frame to minislots and populating the minislots vertically and then horizontally as function of the original one-dimensional start time, type of traffic and duration.

The illustrations shows the zig-zag pattern translating each MAC frame vertically across 30 sub-channels frequencies then shifting time slots forward one sub-frame duration interval where the same process is repeated until the end of the MAP interval. This may include separating one or more portions of one or more of the MAC frame 68 across multiple sub-channels, channels and sub-frames (timeslots), depending on the length of each MAC frame 68. As shown, the MAC frame 68 is split between two sub-channels (in frequency) and eight sub-frames (in time), which vary from the zig-zag pattern shown in FIG. 3. This alternation results in the duration of the convergence frame 76 being shorter in duration than the MAC frame 68, i.e., the number of sub-channels (frequency domains) is proportional to a reduction in a duration of the convergence frame 76 when compared to the duration of the MAC frame 68. It is, however, only one of many possible alterations that may be performed depending on network and transmission efficiencies whereby at different points in time it may be more efficient to spread the MAC frame 68 across more or less sub-channels and/or across more or less sub-frames in order to minimize the total number of sub-channels required to transmit the MAC frame 68.

Block 80 relates to a PHY layer operating on the end station appending PHY data to the convergence frame 76 to create a PHY frame 82. The PHY data may be used to prepare the convergence frame 76 for transmission over the network 22, which may include adding a preamble to be use by a receiving device to detect and synchronize the incoming frame and to estimate the channel characteristics between the transmitter and receiver. The PHY data may also include forward error correction (FEC) data added at the end of each frame to provide redundant data the receiver can used to detect and correct errors. The amount of FEC and preamble is adjusted such as to maintain constant capacity available to the upper layers thereby decoupling the MAC from the PHY layers.

While the foregoing description periodically references particular protocols and acronyms, these recitations are provided for exemplary purposes, and unless otherwise noted, are not necessarily intended to limit the scope and contemplation of the present invention. As one skilled in the art will appreciate, the decoupled layer contemplated by the present invention may be suitable for use within any number of layered architectures and need to be configured to the specific architectures noted above. In particular, the nomenclature used to distinguish the referenced layers form each other may substitute or change according to the application of the invention, such as to perform or facilitate operations similar or equivalent to those referenced above, without deviating from the scope and contemplation of the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium comprising computer-executable instructions stored therein for performing a method of communicating data from an end station receiving a data input comprising:

adding logical link control (LLC) data to the data input to form a LLC frame using a LLC layer operating on the end station;

adding media access control (MAC) data to the LLC frame to form a MAC frame using a MAC layer operating on the end stations;

adding convergence data to the MAC frame to form a convergence frame using a convergence layer operating on the end station;

adding physical (PHY) data to the convergence frame to form a PHY frame using a PHY layer operating on the end station;

configuring the MAC data as one-dimensional data sufficient to indicate a start time and a duration of the MAC frame, the start time indicating a desired time to begin transmitting the MAC frame and the duration indicating a length of time needed to transmit the MAC frame; and configuring the convergence data as two-dimensional data sufficient to translate the one-dimensional start time and duration of the MAC frame to frequency and time coordinates of a two-dimensional MAP used by the convergence layer to indicate start time, start frequency, duration according to a number of sub-frames and bandwidth according to number of sub-channels of the convergence frame.

2. The non-transitory computer-readable medium of claim 1 further comprising computer-executable instructions for configuring the convergence data to the frequency and time coordinates of the two-dimensional MAP in a zig-zag pattern.

3. The non-transitory computer-readable medium of claim 1 further comprising computer-executable instructions for configuring the PHY data to add a preamble and a forward error correction (FEC) to the convergence frame.

4. The non-transitory computer-readable medium of claim 1 further comprising computer-executable instructions for, prior to adding the LLC data, adding application data to the data input using an application layer operating on the end station to form an application frame.

5. The non-transitory computer-readable medium of claim 4 further comprising computer-executable instructions for, after adding the application data and prior to adding the LLC data, adding transmission control protocol (TCP) data to the application frame using a TCP layer operating on the end station to form a TCP frame.

6. The non-transitory computer-readable medium of claim 5 further comprising computer-executable instructions for, after adding the TCP data and prior to adding the LLC data, adding Internet protocol (IP) data to the TCP frame using an IP layer operating on the end station to form an IP frame, the LLC data being added to the IP frame to form the LLC frame.

7. A end station comprising:
a memory operable to store code associated with a layered operating system;
a processor operable to execute operations according to the code specified within the layer operation system; and
wherein the layered operating system specifies executing the following operations to a received frame prior to transmission over a network;
(i) adding media access control (MAC) data to the received frame to form a MAC frame according to MAC layer code stored on the memory, the MAC data one-dimensionally specifying start time and duration of the MAC frame;
(ii) adding convergence data to the MAC frame to form a convergence frame according to convergence layer code stored on the memory, the convergence data two-dimensionally translating the MAC frame to minislots of a MAP defined according to sub- channels and sub-frames; and
(iii) adding physical (PHY) data to the convergence frame to form a PHY frame according to PHY layer codes stored on the memory.

8. The end station of claim 7 further comprising configuring the PHY data such that a capacity per minislot is maintained constant.

9. The end station of claim 7 further comprising adding the convergence data to translate the MAC frame across at least two frequencies in the frequency domain such that a duration of the convergence frame is proportionally less than the duration of the MAC frame.

10. The end station of claim 9 further comprising the PHY data adding PHY preambles to each portion of the convergence frame translated across different frequencies of the at least two frequencies.

11. The end station of claim 7 further comprising the layered operating system specifying execution of the following operations:
(i) generation of an application frame from an input according to application layer code stored in the memory;
(ii) adding transmission control protocol (TCP) data to the application frame to form a TCP frame according to TCP layer code stored in the memory;
(iii) adding Internet protocol (IP) data to the TCP frame to form an IP frame according to IP layer code stored in the memory; and
(iv) adding logical link control (LLC) data to the IP frame to form a LLC frame according to LLC layer code stored in the memory, the LLC frame being the received frame.

12. A layered based method of processing data on a device for transport over a network, the method comprising:
generating an application frame from an input according to an application layer executing on the device;
adding transmission control protocol (TCP) data to the application frame to form a TCP frame according to a TCP layer executing on the end station;
adding Internet protocol (IP) data to the TCP frame to form an IP frame according to an IP layer code executing on the device;
adding logical link control (LLC) data to the IP frame to form a LLC frame according to a LLC layer executing on the device;
adding media access control (MAC) data to the LLC frame to form a MAC frame according to a MAC layer executing on the device, the MAC data one-dimensionally specifying start time and duration of the MAC frame;
adding convergence data to the MAC frame to form a convergence frame according to a convergence layer executing on the device, the convergence data two-dimensionally translating the MAC frame to minislots over of a MAP according to sub-channels and sub-frames; and
adding physical (PHY) data to the convergence frame to form a PHY frame according to a PHY layer executing on the device, the PHY frame being suitable for transport over the network.

13. The method of claim 12 further comprising the convergence data translating the MAC frame across at least two sub-channels.

14. The method of claim 12 further comprising the PHY data adding PHY preambles and FEC such that a constant payload capacity is achieved with each portion of the convergence frame translated across different sub-channels of the at least two sub-channels.

15. The method of claim 12 further comprising adding the MAC data without the MAC layer identify a frequency at which the PHY frame is to be transported over the network.

16. The method of 12 further comprising executing the application, TCP, IP, LLC, MAC, convergence and PHY layers as function of corresponding code stored in a memory of the device and processed with a processor.

* * * * *